«12» United States Patent
Randolph (10) Patent No.: US 10,436,971 B2
(45) Date of Patent: Oct. 8, 2019

(54) WALL WASHING LIGHT FIXTURES (71) Applicant: Cree, Inc., Durham, NC (US)

(72) Inventor: David N. Randolph, Wake Forest, NC (US)

(73) Assignee: Ideal Industries Lighting, LLC, Sycamore, IL (US)

( * ) Notice: Subject to any disclaimer, the term of this patent is extended or adjusted under 35 U.S.C. 154(b) by 145 days.

(21) Appl. No.: 15/413,193

(22) Filed: Jan. 23, 2017

(65) Prior Publication Data

US 2018/0210135 A1 Jul. 26, 2018

(51) Int. Cl.
| | |
|---|---|
| *F21V 8/00* | (2006.01) |
| *F21S 8/04* | (2006.01) |
| *F21Y 105/10* | (2016.01) |
| *F21Y 115/10* | (2016.01) |
| *F21S 8/02* | (2006.01) |
| *F21Y 113/00* | (2016.01) |

(52) U.S. Cl.
CPC ........... *G02B 6/0055* (2013.01); *G02B 6/005* (2013.01); *G02B 6/0036* (2013.01); *F21S 8/026* (2013.01); *F21Y 2105/10* (2016.08); *F21Y 2113/00* (2013.01); *F21Y 2115/10* (2016.08)

(58) Field of Classification Search
CPC ......... F21V 5/008; F21V 7/0025; F21S 8/033
See application file for complete search history.

(56) References Cited

U.S. PATENT DOCUMENTS

| | | | | |
|---|---|---|---|---|
| 5,662,403 | A * | 9/1997 | Akashi | F21S 8/02 362/292 |
| 6,994,456 | B1 * | 2/2006 | Russo | F21S 8/02 362/147 |
| 2010/0309411 | A1 * | 12/2010 | Shibata | B29D 11/00798 349/64 |
| 2012/0320588 | A1 * | 12/2012 | Quilici | F21S 8/026 362/249.02 |
| 2014/0204594 | A1 * | 7/2014 | Kanazawa | F21S 8/026 362/362 |
| 2017/0254487 | A1 * | 9/2017 | Matsubayashi | F21V 3/0625 |

* cited by examiner

*Primary Examiner* — Alexander K Garlen
*Assistant Examiner* — Eric T Eide
(74) *Attorney, Agent, or Firm* — J. Clinton Wimbish; Nexsen Pruet, PLLC (57) ABSTRACT

In one aspect, light fixtures are described herein employing waveguide components for delivery of directional light to wall surfaces and/or surfaces outside the general down lighting distribution of the fixture. A light fixture comprises a light source component in an optic assembly, the light source component comprising a first light source providing a down lighting distribution and a second light source coupled to a waveguide component of the optic assembly providing one or more lateral lighting distributions from the light fixture. The waveguide component comprises at least one waveguide optic comprising a body and a light extraction face, the light extraction face forming one or more sidewall portions of the optic assembly.

25 Claims, 8 Drawing Sheets

WALL WASHING LIGHT FIXTURES

FIELD

The present invention relates to light fixtures and, in particular, to light fixtures employing one or more waveguides for delivery of directional light to wall surfaces and/or surfaces outside the general down lighting distribution of the fixture.

BACKGROUND

Wall washing and wall grazing light fixtures have design and architecture to direct light at one or more walls when mounted on the ceiling/floor or recessed into the ceiling/floor as opposed to being mounted on the wall itself. Providing sufficient wall lighting from such fixtures can be a challenge. Present wall wash fixtures often employ one or more reflectors coupled to the interior of a recessed optic for directing light to one or more walls. Reflective optics within the fixture recess can present several disadvantages. An interior reflector, for example, can clutter the recess thereby rendering the fixture aesthetically unpleasing. Interior reflector(s) can also complicate fixture design and increase manufacturing time and costs. On the performance side, interior reflective optics necessarily redirect a portion of the downlight to one or more walls, leading to inefficiencies in lighting floors and/or other surfaces normally in the downlight path.

SUMMARY

In one aspect, light fixtures are described herein employing waveguide components for delivery of directional light to wall surfaces and/or surfaces outside the general down lighting distribution of the fixture. Briefly, a light fixture comprises a light source component in an optic assembly, the light source component comprising a first light source providing a down lighting distribution and a second light source coupled to a waveguide component of the optic assembly providing one or more lateral lighting distributions from the light fixture. The waveguide component comprises at least one waveguide optic comprising a body and a light extraction face, the light extraction face forming one or more sidewall portions of the optic assembly. In some embodiments, the waveguide component comprises a plurality of waveguide optics, the waveguide optics comprising light extraction faces forming sidewall portions of the optic assembly.

In another aspect, methods of wall illumination are described herein. In some embodiments, a method of wall illumination comprises providing a light fixture comprising a light source component positioned in an optic assembly, the light source component comprising a first light source providing a down lighting distribution and a second light source coupled to a waveguide component of the optic assembly. Light is coupled from the second light source into the waveguide component, and the light is extracted from the waveguide component to provide one or more lateral lighting distributions illuminating wall surfaces. Surfaces of one or more walls can be illuminated with the light fixture. As described further herein, lateral lighting distributions provided by the light fixtures can also illuminate non-wall surfaces falling outside the down lighting distribution provided by the first light source.

These and other embodiments are described further in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In one aspect, light fixtures are described herein employing waveguide components for delivery of directional light to wall surfaces and/or surfaces outside the general down lighting distribution. A light fixture comprises a light source component in an optic assembly, the light source component comprising a first light source providing a down lighting distribution and a second light source coupled to a waveguide component of the optic assembly providing one or more lateral lighting distributions from the light fixture. The waveguide component comprises at least one waveguide optic comprising a body and a light extraction face, the light extraction face forming one or more sidewall portions of the optic assembly. Importantly, the light fixture is not limited to specific design and/or lighting application. Light fixtures providing lateral lighting distributions described herein, in some embodiments, can be downlights, high bay fixtures, low bay fixtures or any fixture also having a downlight distribution. In some embodiments, light fixtures are mounted on the ceiling or recessed into the ceiling. Alternatively, the light fixture can be mounted on the floor or recessed into the floor for delivery of directional light to wall surfaces and/or surfaces outside the lighting distribution provided by the first light source of the fixture. When mounted on the floor or recessed into the floor, the light fixture can provide an up-lighting distribution with the first light source as opposed to the down lighting distribution when ceiling mounted. The second light source and waveguide optic(s) provide one or more lateral lighting distributions outside the up-lighting distribution.

Figure 1A:
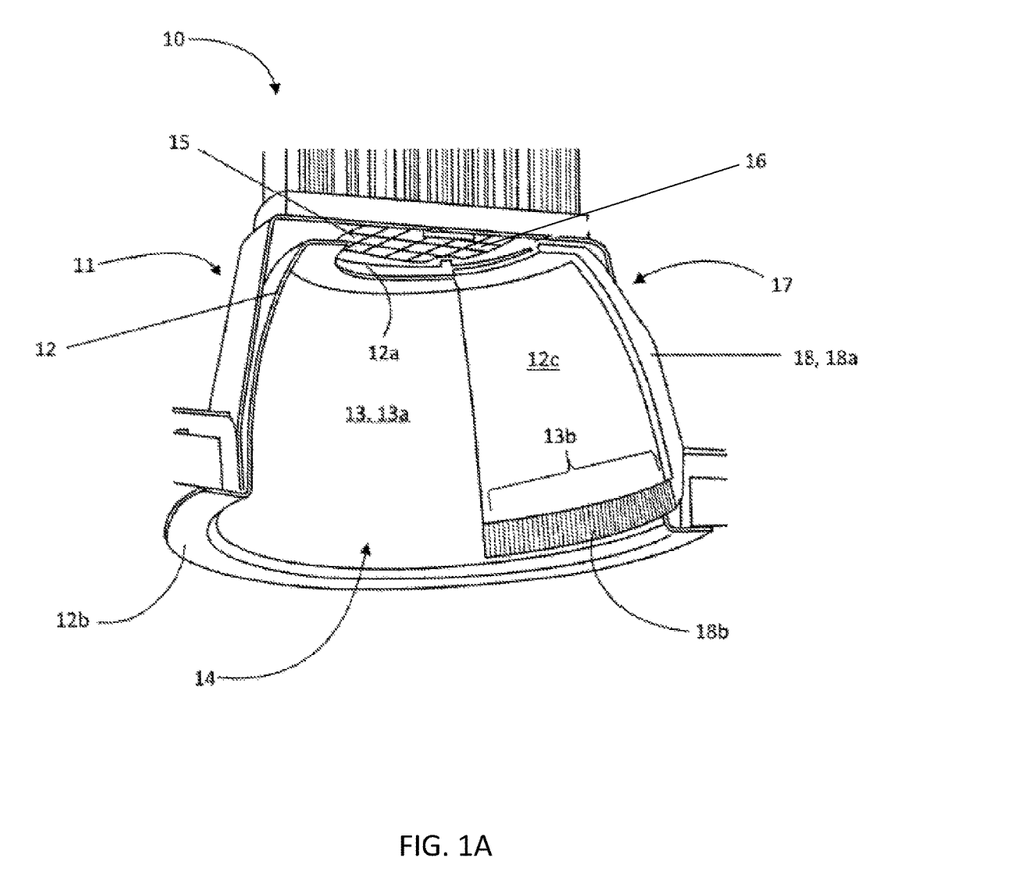
FIG. 1A illustrates a cross-sectional view of a downlight fixture according to some embodiments.

Referring now to FIG. 1A, a cross-sectional view of a downlight fixture is illustrated according to some embodiments. In the non-limiting embodiment of FIG. 1, the optic assembly 11 of the downlight fixture 10 comprises a round reflector 12 defining a sidewall 13 of the optic assembly 11. The sidewall 13 defines a recess 14 in which the first light source 15 and second light source 16 are positioned. In some embodiments, interior surfaces 13a of the sidewall 13 are specularly reflective and/or exhibit diffuse reflectance. Interior surfaces 13a of the sidewall 13 can have any reflective properties, shape, structure and/or arrangement for providing the desired down lighting distribution from the downlight fixture 10.

The waveguide component 17 of the optic assembly 11 comprises a waveguide optic 18, the waveguide optic 18 including a waveguide body 18a and light extraction face 18b. The light extraction face 18b forms a sidewall portion 13b of the optic assembly 11. In the embodiment of FIG. 1A, the sidewall portion 13b formed by the light extraction face 18b resides at the outer or bottom rim 12b of the reflector 12. By forming a sidewall portion 13b of the optic assembly 11, the light extraction face 18b can exhibit an orientation suitable for providing one or more lateral lighting distributions from the fixture 10. As described further herein, the light extraction face 18b can comprise various light extraction elements operable to provide specific lateral lighting distributions. The waveguide body 18a extends from the light extraction face 18b to the top opening or entrance 12a of the reflector 12. In the embodiment of FIG. 1, the waveguide optic 18 forms a section of the reflector 12, and a cover 12c is employed to conceal the waveguide body 18a. The cover 12c forms a portion of the sidewall 13 and can have can have any reflective properties, shape, structure and/or arrangement for providing the desired down lighting distribution from the downlight fixture 10. In this way, the waveguide body 18a does not disrupt the reflective interior, and the open nature of the downlight fixture is maintained. This is in sharp contrast to prior designs where cumbersome and aesthetically displeasing reflectors are arranged in the open interior of the fixture for achieving lateral or side lighting distributions.

Figure 1B:
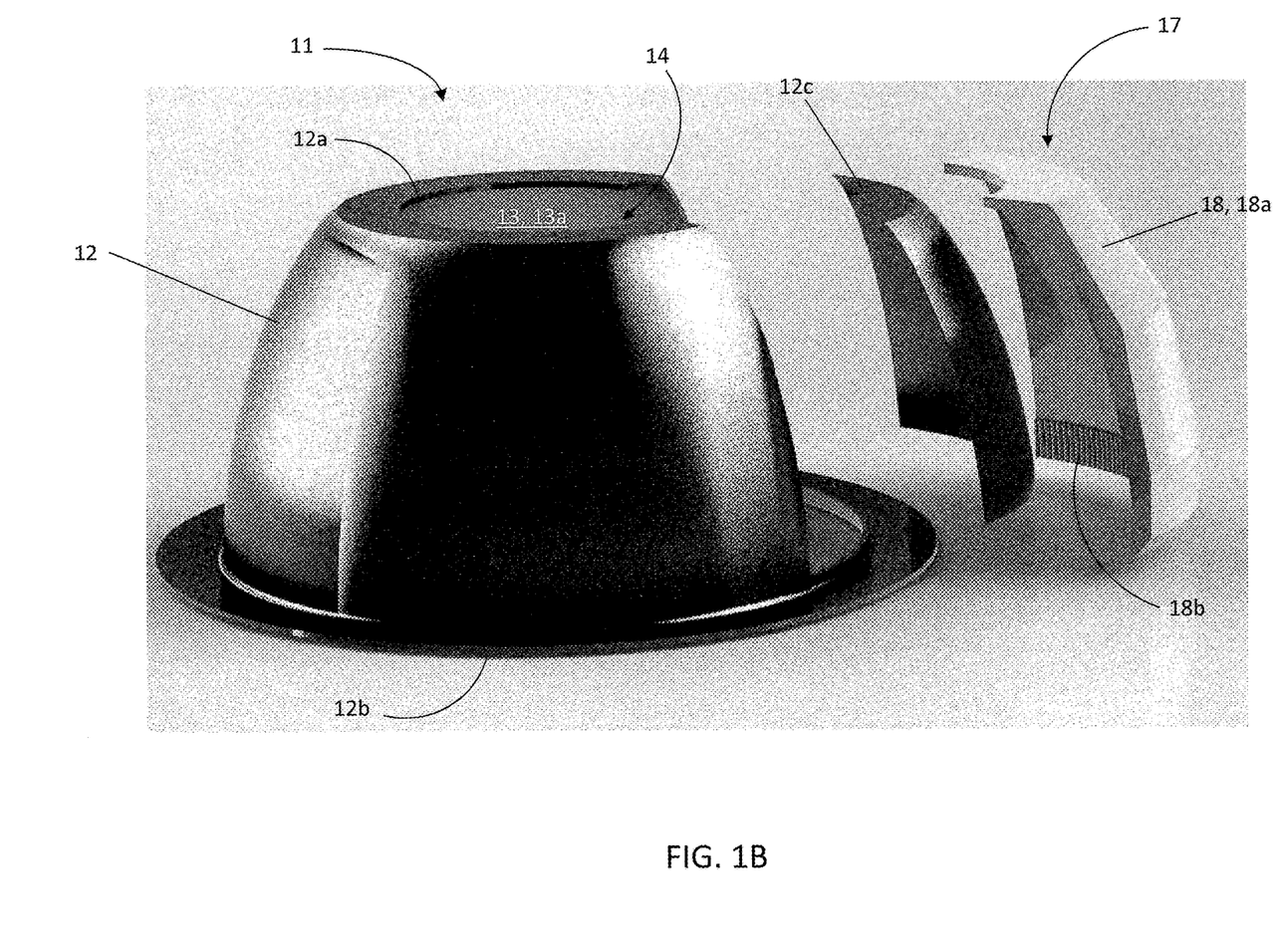
FIG. 1B illustrates an exploded view of the optic assembly of FIG. 1A according to some embodiments.

FIG. 1B illustrates an exploded view of the optic assembly of FIG. 1A. As provided in FIG. 1B, the waveguide optic 18 forms a section of the reflector 12. A cover 12c is positioned to overlay the waveguide body 18a and complete the interior of the reflector 12. The cover 12c does not extend over the light extraction face 18b of the waveguide optic 18. Accordingly, the light extraction face 18b forms a sidewall portion 13b of the optic assembly 11 for providing a lateral lighting distribution from the downlight fixture. In other embodiments, the waveguide optic does not form a section of the reflector. Instead, the waveguide optic can extend along an outer surface of the reflector wherein one or more apertures are provided in the reflector sidewall for receiving the light extraction face of the waveguide optic.

Referring once again to FIG. 1A, a first light source 15 is positioned at top entrance 12a of the reflector 12. The first light source 15 is oriented to provide a down lighting distribution and can have an orientation normal or substantially normal to nadir. A second light source 16 is coupled to the waveguide optic 17 proximate the reflector top entrance 12a. In being positioned proximate the reflector top entrance 12a, the first and second light sources exhibit a recessed arrangement relative to the reflector 12 of the optic assembly 11. Light from the second light source 16 is coupled into the waveguide optic 18 for extraction by the light emitting face 18b, thereby providing one or more lateral lighting distributions.

Figure 2:
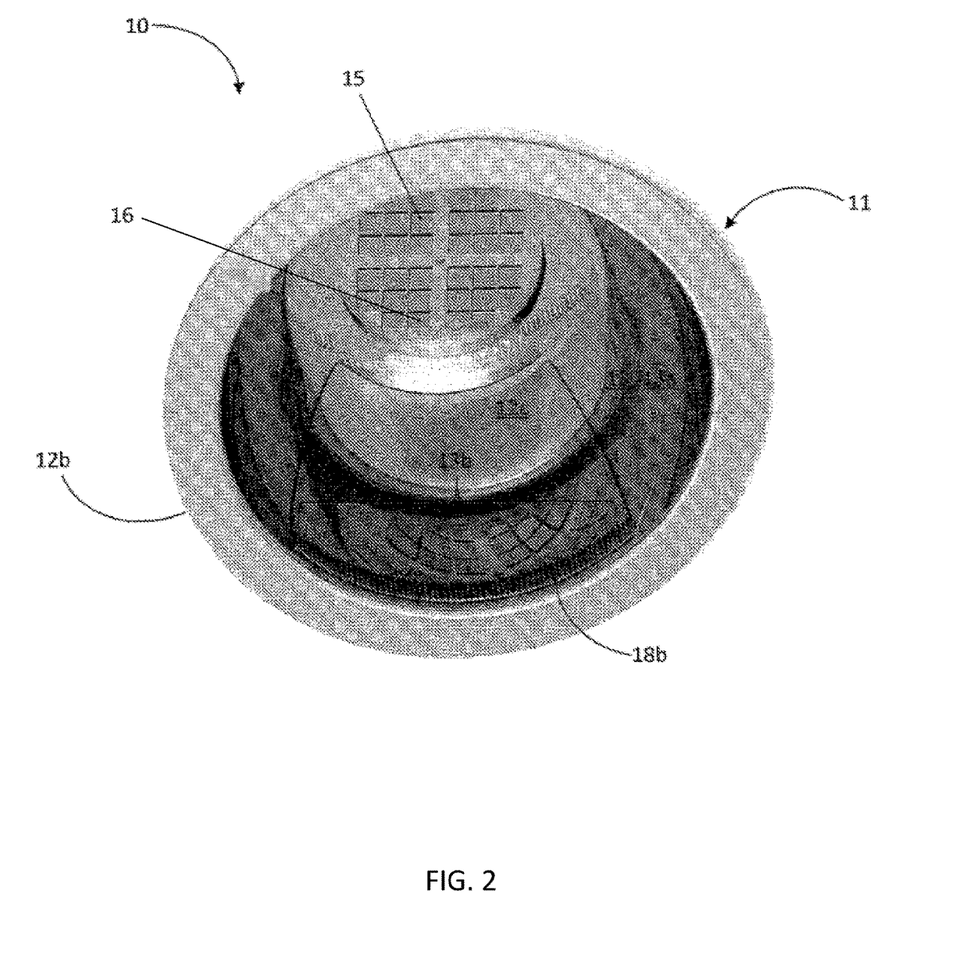
FIG. 2 illustrates a bottom perspective view of a downlight fixture according to some embodiments.

FIG. 2 illustrates a bottom perspective view of a downlight fixture according to some embodiments. The interior reflective sidewall 13a of the optic assembly 11 defines a recess 14 in which the first and second light sources 15, 16 are positioned. The light extraction face 18b of the waveguide optic 18 forms a sidewall potion 13b of optic assembly 11. The cover 12c is employed to conceal the waveguide body 18a which extends from the light extraction face 18b to couple with the second light source 16 positioned at the top opening 12a of the reflector 12.

In the embodiment of FIGS. 1-2, the waveguide component of the downlight fixture comprises a single waveguide optic. It is contemplated that the waveguide component can comprise a plurality of waveguide optics, the waveguide optics comprising light extraction faces forming sidewall portions of the optic assembly. Second light sources are coupled to each of the waveguide optics for providing lateral lighting distributions. Any number and arrangement of waveguide optics and associated light extraction faces are contemplated. Number of waveguide optics can be selected according to several considerations including, but not limited to, lighting environment of the downlight fixture and desired number of lateral lighting distributions provided by the fixture. Light extraction faces forming sidewall portions of the optic assembly can have any arrangement relative to one another. In some embodiments, light extraction faces are spaced apart from one another in the optic assembly. Spacing of the light extraction faces can be periodic or aperiodic. Moreover, light extraction faces forming sidewall portions can exhibit any angular or radial distribution or spacing relative to one another. Angular or radial distribution of light extraction faces can be dependent upon shape and dimension of the optic assembly, number of light extraction faces and desired lateral lighting distributions from the fixture. For example, light extraction faces forming sidewall portions of an elliptical or round optic assembly, such as that illustrated in FIGS. 1-2, can exhibit radial spacing of 30°, 45°, 60°, 90°, 120°, 150° or 180°, in some embodiments. For downlight fixtures comprising an optic assembly of polygonal cross-section, such as square, rectangular or hexagonal, light extraction faces can exhibit an angular distribution relative to one another of 60°, 90°, 120° or 180°, in some embodiments.

In other embodiments, light extraction faces forming sidewall portions of the optic assembly are continuous with one another. In some embodiments, light extraction faces are continuous over the entire perimeter of the optic assembly. For example, light extraction faces 13b can form a ring along the sidewall 13 of the round reflector 20 of FIGS. 1-2. In other embodiments, light extraction faces can be continuous over less than the entire perimeter of the optic assembly.

Light extraction faces forming sidewall portions can be positioned in the optic assembly to provide lateral lighting distributions directly to surfaces, such as one or more wall surfaces. Referring once again to FIGS. 1-2, the light extraction face 18b is positioned at the outer or bottom rim 12b of the reflector 12 of the optical assembly 11. Residence of the bottom rim 12b facilitates lateral lighting distributions to exit the light emitting face 18b for direct illumination of a wall surface and/or other surfaces outside the general down lighting distribution of the fixture. As described further herein, extraction elements and/or features of the light extraction face can assist with providing a lateral lighting distribution directly to surfaces outside the general downlighting distribution. In other embodiments, sidewall portion(s) can be positioned in the optical assembly such that light emitting from light extraction face(s) interacts with one or more optical elements of the optic assembly to provide a lateral lighting distribution. For example, a sidewall portion formed by a light extraction face 18b of FIGS. 1-2 can reside deeper into the recess 14 formed by the reflector sidewall 13. Light emitted from the light extraction face 18b is reflected by interior surfaces 13a of the sidewall 13 to provide a lateral lighting distribution. In some embodiments, a downlight fixture can comprise any combination of light extraction sidewalls positioned for direct surface illumination and light extraction sidewalls positioned for interaction with one or more optical elements of the optic assembly.

While FIGS. 1-2 illustrate the optic assembly comprising a reflector, other optical elements are contemplated. In some embodiments, the optic assembly comprises a refractive optical element having one or more sidewall portions formed by light extraction faces of waveguide optics. For example, the refractive optic can adopt a shape similar to the reflector 20. One or more waveguide optics can form section(s) of the refractive optic. Alternatively, a waveguide optic can couple to the exterior of the refractive optic. Given the refractive nature of the optic, one or more covers may not be required to overlay the wavedguide body. In some embodiments, the optic assembly comprises a combination of reflective and refractive optical elements. Reflective and refractive optical elements of an optic assembly can have any arrangement or positioning not inconsistent with the objectives of the present invention.

It can be easily envisioned that the foregoing design features and architectural principles of the downlight fixture 10 illustrated in FIGS. 1-2 can be extended to other fixtures including high bay fixtures, low bay fixtures or any fixture providing a down lighting distribution. For high bay and low bay applications, for example, lateral lighting distributions provided by the waveguide component can provide illumination to narrow spaces, such as aisles, hallways and/or corners of a building or house, in addition to the down lighting distribution.

A lateral lighting distribution provided by light fixtures described herein, in some embodiments, has peak intensity at angles greater than 30 degrees relative to nadir. Peak intensity of a lateral lighting distribution provided by light fixtures described herein can also have one or more values selected from Table I.

TABLE I

| Peak Intensity of Lateral Lighting Distribution Relative to Nadir |
| --- |
| ≥40 |
| ≥50 |
| ≥60 |
| ≥70 |
| ≥80 |
| 30-85 |
| 40-85 |
| 50-85 |
| 60-85 |

Turning now to specific components, a waveguide optic of the waveguide component comprises a body and light extraction face. The waveguide body can be formed of any suitable waveguide material including acrylic, silicone, polycarbonate, glass and/or other suitable optically transmissive materials operable to support total internal reflection (TIR). In some embodiments, for example, the waveguide body is formed of polymethyl methacrylate (PMMA) or derivative thereof. Waveguide material can be selected according to various considerations including the mechanical and/or chemical demands of the environment in which the waveguide body will operate. Moreover, the waveguide body can have any dimensions and shape not inconsistent with the objectives of the present invention. Waveguide body shape may selected according to several considerations including, but not limited to, the shape of the optic assembly and whether the waveguide optic forms a section of the optic assembly or is coupled to an exterior surface of the optic assembly.

Figure 3A:
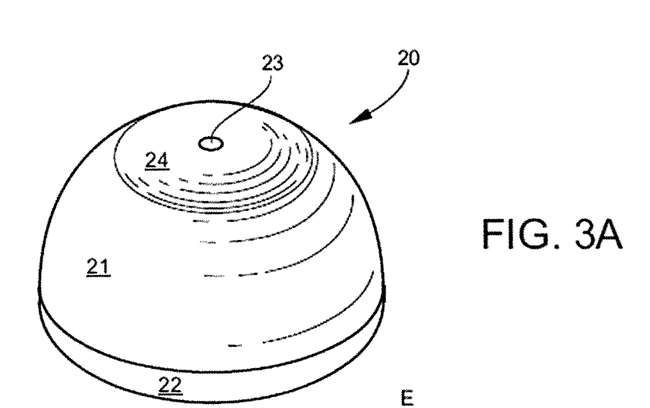
FIGS. 3A-3C illustrate geometry and features of a light extraction element according to some embodiments.
Figure 3B:
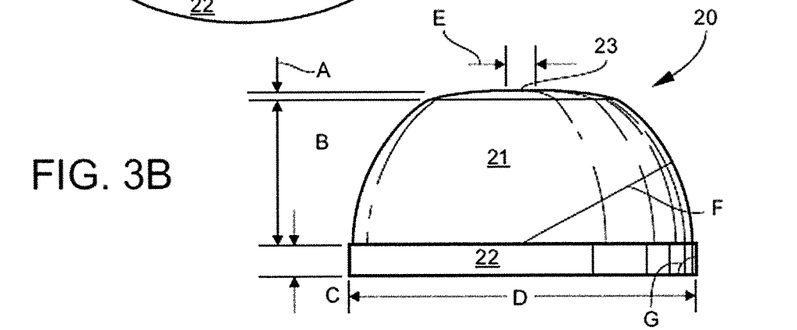
Figure 3C:
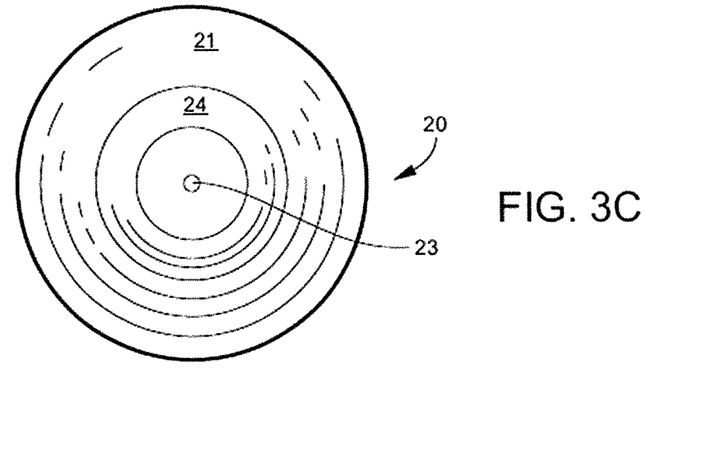
Figure 4A:
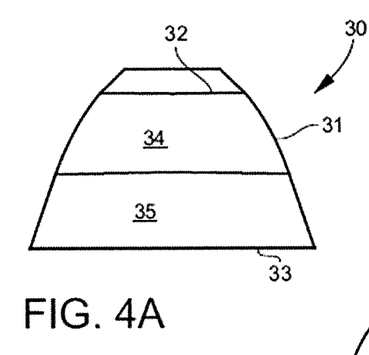
FIGS. 4A and 4B illustrate geometry and features of a light extraction element according to some embodiments.
Figure 4B:
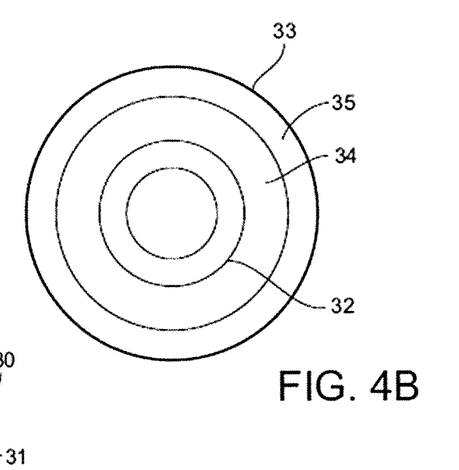
Figure 5A:
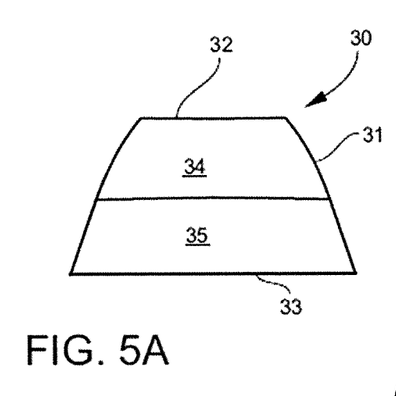
FIGS. 5A and 5B illustrate geometry and features of a light extraction element according to some embodiments.
Figure 5B:
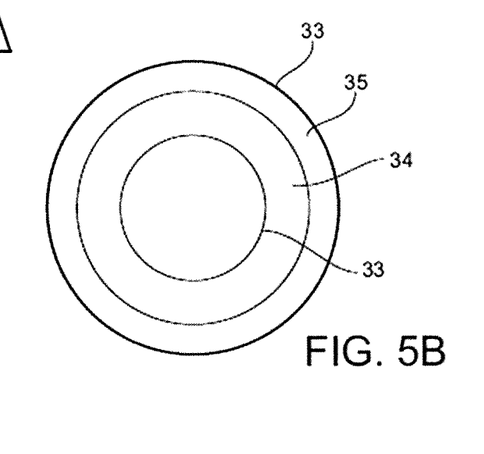

The light extraction face comprises light extraction elements. In some embodiments, light extraction elements are bonded to one or more surfaces of the waveguide body to form the light extraction face. The size, shape and/or density of individual light extraction elements can be uniform or vary across one or more surfaces of the waveguide body in a regular or irregular fashion to produce desired lateral lighting distributions in conjunction with the second light source. In some embodiments, light extraction elements can be protrusions, bumps, depressions or various combinations thereof. Light extraction elements have symmetrical shape or geometry. For example, individual light extraction elements can have a hemispherical profile or polygonal profile. Another geometry particularly useful for a range of lighting applications includes a roughly "bullet shaped" profile as illustrated in FIGS. 3A-3C, consisting of a truncated curved surface 21, such as a truncated hemisphere with an adjacent cylindrical or conical base 22. If desired, a bonding feature 24 having a central planar portion 23 may be formed atop the truncated hemispherical portion 21. In some embodiments, the bonding feature 24 facilitates fabrication by enabling the bond between the extraction element 20 and the waveguide surfaces to be free of air pocket(s) that may otherwise form.

This particular geometry provides a high degree of directionality as well as a range of possible illuminance distributions that may be realized by changing the height at which the curved surface is truncated. The height B of the hemispherical portion 21 affects the distribution of the light illumination of the waveguide 11 while the height C of the base 22 affects the percentage of light emitted downwardly relative to upward emitted light. With reference to FIG. 3B, the light extraction element 20, in one embodiment, can have dimensions listed in Table II.

TABLE II

Light Extraction Element Dimensions

| A | 0.025 mm |
| B | 0.415 mm |
| C | 0.085 mm |
| D | 1.0 mm |
| E | 0.050 mm |
| F | 0.510 mm radius of curvature |
| G | 89 degrees |

Additional embodiments of light extraction elements 30 are illustrated in FIGS. 4A, 4B, 5A and 5B. Each extraction feature 30 includes a body 31 having a curved shape that extends between an aperture 32 adjacent a surface of the waveguide body and a base 33 opposite the aperture 32. The aperture 32 and the base 33 may be parallel or disposed at an angle relative to one another, as may be desired for a specialized asymmetric distribution. The body 31 may include planar surfaces, curved surfaces, planar surfaces approximating one or more curved surfaces, or a combination thereof. The cross sectional outer profile of the body 31 may be symmetric in nature (e.g., as in the case of a hemisphere) or asymmetric (e.g., as in the case of an ellipse or other combination of shapes when viewed from above or below). The body 31 may include a first portion 34 adjacent the aperture 32 and a second portion 35 adjacent the base 33.

In some embodiments, the first portion 34 may be designed to redirect incident light downward through total internal reflection (TIR). In some embodiments, shape of the extraction feature 30 may be determined by iteratively plotting the points defining an outer surface of the shape using a differential or quasi-differential equation.

Figures 6, 7:
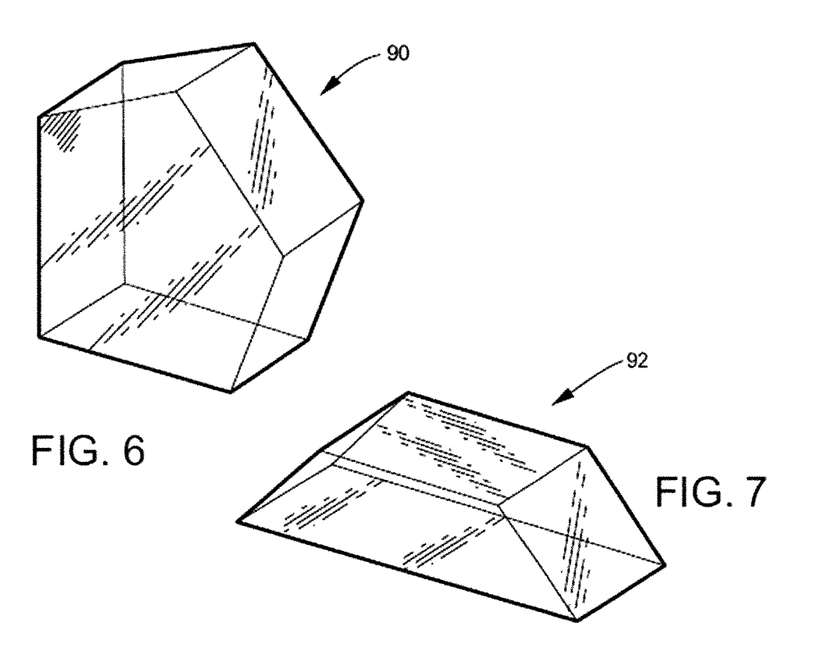
FIGS. 6-8 are perspective views of prismatic shaped light extraction elements according to some embodiments.
Figure 8:
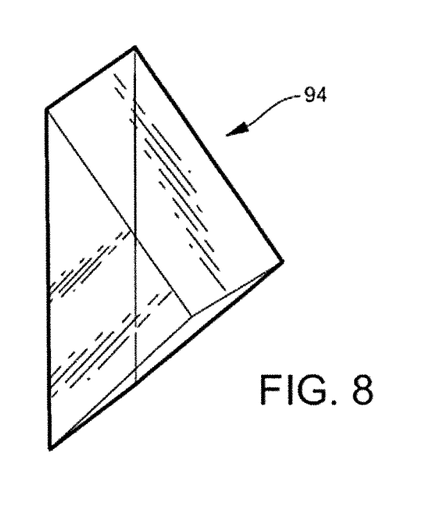

FIGS. 6-8 illustrate alternative shaped light extraction elements. The light extraction elements in FIGS. 6-8 have prismatic shapes providing for alternative undercut geometries for light extraction. In particular, a penta prism shape 90 is shown in FIG. 6, a dove prism shape 92 is shown in FIG. 7 and a porro prism shape 94 is shown in FIG. 8. Various arrangements and combinations of truncated curved and prismatic shaped light extraction elements may be selectively employed for the light extraction face of the waveguide optic.

Figure 9:
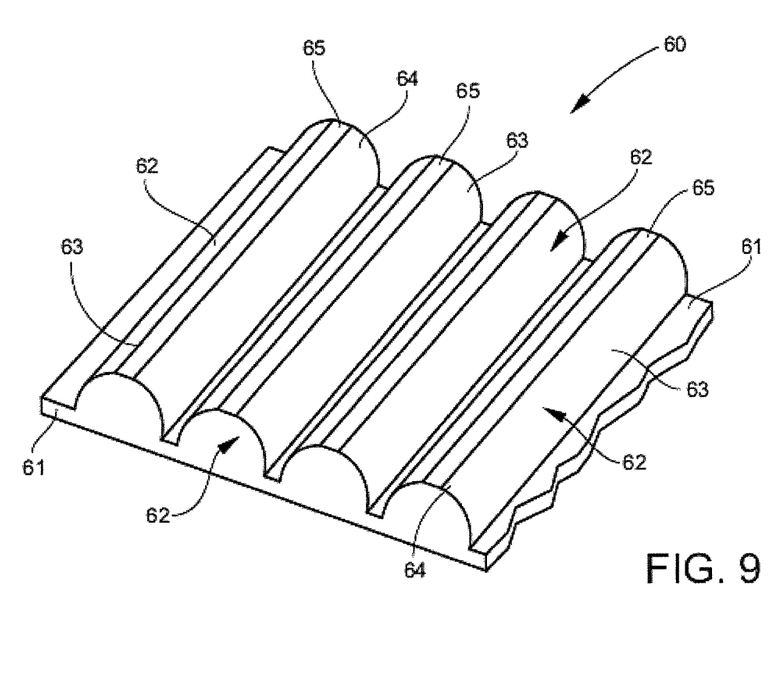
FIG. 9 is a fragmentary perspective view a light extractor plate of a waveguide optic comprising parallel protrusions of light extraction elements according to some embodiments.

As described herein, light extraction elements can be part of a light extractor plate, wherein the light extractor plate is bonded to one or more surfaces of the waveguide body to provide the light extraction face. The light extraction elements, for example, can be arranged on a substrate or base. The substrate may be a planar member such as a film, a plate, a block of material or the like. Referring to FIG. 9, another example of an extractor plate 60 includes a base 61 and undercut light extraction elements 62 disposed on the base 61. In this embodiment, the light extraction elements 62 form a series of elongate parallel protrusions 63 extending from the base 61. The elongate parallel protrusions 63 of the light extraction elements 62 seen in the embodiment of FIG. 9 may have a hemispherical cross section shape. A top portion 64 of the light extraction elements 62 may have a generally flattened surface 65 to provide a truncated hemispherical shape of the light extraction elements 62 extending from the base 61.

Figure 10:
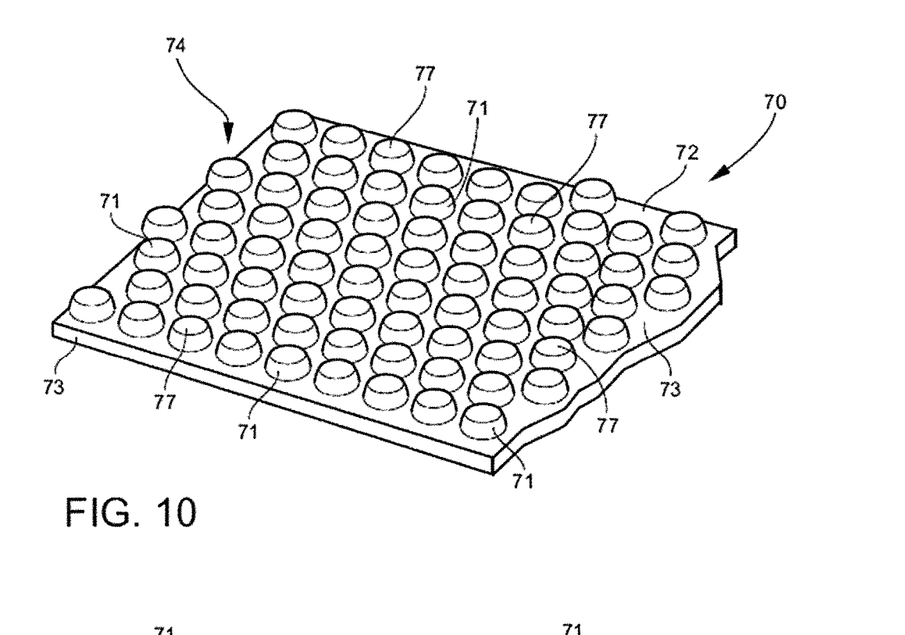
FIG. 10 is a fragmentary perspective view of a light extractor plate of a waveguide optic comprising an array of light extraction elements on a substrate or film according to some embodiments.
Figure 11:
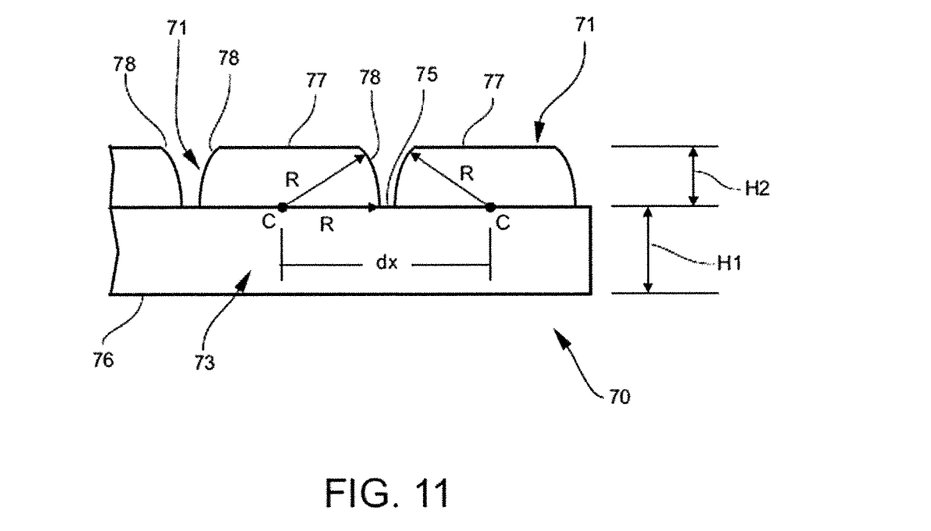
FIG. 11 is a fragmentary elevational view of an extractor plate comprising a substrate and light extraction elements according to some embodiments.

FIGS. 10 and 11 illustrate another embodiment of an extractor plate 70 in which light extraction elements 71 are disposed in a regular pattern atop a surface 72 of the base 73. In this illustrated example, the extractor plate 70 comprises an array 74 of regularly-spaced light extraction elements 71, although it should be noted that the light extraction elements may be irregularly spaced or some may be regularly spaced and others irregularly spaced, etc. Further, the geometry and size of the light extraction elements 71 may vary across the film 70 in either a regular or irregular fashion. In this example, the optically transmissive extractor plate 70 may be formed with the light extraction elements 71 disposed in a hexagonal array 74 on the top surface 72 of the base 73. The undercut light extraction elements 71 are of substantially the same size and have substantially the same shape across the surface of the base 73 in this embodiment. The undercut light extraction elements 71 arranged in the hexagonal array 74, in this example, have a truncated hemispherical shape. The light extraction elements 71 may have other shape(s) necessary to produce a desired light distribution. The light extraction elements 71 may be formed using one of a variety of techniques typically applied to the formation of micro-optical films, including gray-scale lithography, micro-replication, injection/compression molding, reactive ion etching, chemical embossing during production of the optically transmissive film 70. The undercut light extraction elements 71 may be formed of any material having suitable optical properties including, but not limited to, acrylic, acrylic based resins, polycarbonate or glass.

As seen in the embodiment of FIGS. 10 and 11, the base 73 has a constant height (H1) or thickness. In alternative embodiments, however, the thickness (H1) of the base 73 may vary at different points along the base. Further, it may be desirable to fabricate varying degrees of roughness, or specific optical features, such as a second set or array of geometrical light extraction elements on the back surface 76 of the film 70 (FIG. 11) in order to further provide control over illuminance distributions. Still further, the thickness (H1) may be essentially zero (e.g., in cases where the light extraction elements 71 are fabricated directly on the waveguide surface). According to one embodiment, the thickness (H1) of the base 32 is about 1 µm to about 5 mm or more, and more preferably is between 250 µm and about 3 mm and most preferably is equal to about 500 µm. Further, as seen in the illustrated embodiment of FIGS. 10 and 11, each of the truncated light extraction elements 71 of the extractor plate 70 may have a height (H2), FIG. 11, extending from the base 73 that is substantially the same for each light extraction element. In alternative arrangements, the height (H2) of the individual light extraction elements 71 may selectively vary within the same extractor plate 70. In some embodiments, the extraction film 70 may be laminated or otherwise affixed to a surface of the waveguide body 12 to provide the light extraction face, such that the height (H2), FIG. 11, of the undercut light extraction elements 71 may be selectively varied to produce a wide range of illuminance distributions according to user preference.

The light extraction elements 71 extend from the top surface 72 of the base 73 to a generally flat surface 77 such that the curved shape of the light extraction member 71 is truncated by the flat surface. In this example, the truncated hemispherical light extraction elements 71 have a uniform rounded side surface 78, FIG. 11, which extends from the top surface 72 of the base 73 to the generally flat surface 77 of the light extraction element 71. As such, with the light extraction elements 71 having a uniform rounded side surface 78, each light extraction element 71 has a cross section dimension that is largest proximal the base 73 and the cross sectional dimension becomes smaller distal from the base as the rounded side surface 78 extends from the base towards the flat portion 77. The hemispherical light extraction elements 71 may have a radius (R) at a preselected length that is truncated by the flat surface 77 to a preselected height (H2). In one example, the hemispherical shaped light extraction elements 71 may have a 600 µm radius that is truncated to a height that may range, for example, between 100-590 µm. Of course, other radial lengths and truncated heights may selectively be employed. Still further, the minimum distances between adjacent light extraction elements 71 may selectively depend on the radius (R) of the light extraction element and the limitations of the film fabrication method employed, with an example minimum distance being twice the radius (2×(R)) or greater. In other examples, values less than twice the radius (2×(R)) may be used where overlapping of the extraction elements is desired for optical reasons (e.g., to improve extraction efficiency).

In the embodiment of FIG. 11, the distances (dx) between the center points (C) of adjacent extraction elements 71 may be consistent throughout the array. The center-to-center spacing (dx) of the protruding light extraction elements 71 may selectively have a value of about twice the radius (2×(R)) in regions where a high level of extraction (and hence a luminance approaching the maximum possible light output for that region) is desired with the bases of the extraction elements just in contact. In regions where reduced luminance are desired, values greater than twice the radius (2×R)) can be used.

Extraction elements may alternatively be disposed on the waveguide body without a base or substrate to provide a light extraction face. For example, the extraction elements may be fabricated directly on surfaces of the waveguide body 12 by means of an intermediate patterning layer as described in U.S. Pat. No. 8,564,004, issued Oct. 22, 2013, entitled "Complex Primary Optics with Intermediate Elements" by Tarsa et al., incorporated by reference herein. Using this method of manufacture, the extraction elements are optically joined to the waveguide body without the need for the base. The patterning layer may be used with any method such as molding, injection molding, compression molding, dispensing, stencil printing, three-dimensional printing, photolithography, deposition, or the like. Specifically, the patterning layer is formed on surface(s) of the waveguide body and includes holes or openings where the waveguide body is exposed. The openings of the patterning layer correspond to locations where the extraction elements are to be formed on the waveguide body. In some embodiments, a mold is then placed over the patterning layer and surface(s) of the waveguide body. The mold includes voids that are aligned with the openings of the patterning layer to define cavities. The cavities are filled with the material of the extraction elements. In other embodiments, the material of the extraction elements is applied to the openings of the patterning layer prior to placement of the mold on the patterning layer. In either case, the material of the extraction feature is then at least partially cured and the mold is removed. The material of the patterning layer may comprise polyvinyl alcohol, a poly(methyl methacrylate) (PMMA) one or more photoresist materials, or other suitable materials. The patterning layer may be removed by a water rinse, heat, vaporization, machining, developers and solvents, chemical etching/solvent, plasma etching, or any method that does not interfere with the material of the waveguide body and/or extraction elements. In further embodiments, the extraction elements are fabricated independent of the waveguide body and subsequently picked and placed in the desired location of the waveguide body. Extraction elements of any size and shape can be independently fabricated and subsequently placed in an array or random position on the waveguide body.

Alternatively, the waveguide body, the extraction elements and/or the base may be bonded to one another through one or more supplemental layers such as an adhesive layer or pressure-sensitive adhesive film. Additional extraction element and extractor plate architectures are described in U.S. patent application Ser. No. 14/472,078 entitled "Waveguide Having Unidirectional Illuminance" by Tarsa et al., U.S. patent application Ser. No. 14/472,035 entitled "Luminaires Utilizing Edge Coupling" by Tarsa et al. and U.S. patent application Ser. No. 14/472,064 entitled "Luminaire with Selectable Luminous Intensity Pattern", each of which is incorporated herein by reference in its entirety.

In some embodiments, light extraction elements forming the light extraction face are not bonded or deposited features. Light extraction elements can comprise indents, depressions, facets or holes extending into the waveguide. Moreover, light extraction elements can comprise inclusions, defects or other light scattering structures on or within the waveguide body.

As described herein, a light fixture comprises a light source component comprising a first light source providing a down lighting distribution and a second light source coupled to the waveguide component of the optic assembly for providing one or more lateral lighting distributions from the fixture. Any light sources not inconsistent with the objectives of the present invention can be employed as the first and second light sources. Fluorescent and/or LED light sources, for example, can be used in the fixture construction. LED light sources may comprise packaged LED chip(s) or unpackaged LED chip(s). LED elements or modules can use LEDs of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to a heat sink or another type of board or substrate. Depending on the embodiment, the light fixture can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. The LEDs may be disposed in different configurations and/or layouts as desired. Different color temperatures and appearances could be produced using other LED combinations of single and/or multiple LED chips packaged into discrete packages and/or directly mounted to a printed circuit board as a chip-on board arrangement. In one embodiment, the light sources can comprise any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In another embodiment, the light sources can comprise XQ-E LEDs developed by Cree, Inc.

Any of the embodiments disclosed herein incorporating LED light sources may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein.

In some embodiments, each LED element or module may comprise one or more LEDs disposed within a coupling cavity with an air gap being disposed between the LED element or module and a light input surface. In any of the embodiments disclosed herein each of the LED element(s) or module(s) can have different or the same light distribution, although each may have a directional emission distribution (e.g., a side emitting distribution), as necessary for coupling with the waveguide.

In some embodiments wherein the first light source and/or second light source comprise LEDs, the LEDs can be arranged in an array format, including one-dimensional arrays or two-dimensional arrays. In the embodiment of FIG. 3, for example, the first light source 15 providing the down lighting distribution of the fixture comprises a two-dimensional array of LEDs. Moreover, the second light source 16 comprises a one-dimensional array of LEDs interfacing with a light coupling region of the waveguide optic 18.

The first and second light sources can be selected to have the same or similar spectral characteristics. Alternatively, the first and second light sources can exhibit differing spectral characteristics. In some embodiments, the first and second light sources have differing correlated color temperature (CCT), chromaticity, intensity and/or color rendering index (CRI). Spectral characteristics of the first and second light sources can be selected according to several considerations including, but not limited to, lighting environment requirements and intended application of the lighting fixture. As described herein, the lighting fixtures can be employed in wall washing applications. In some embodiments, the first light source exhibits spectral characteristics suitable for floor and/or pathway lighting while the second light source exhibits differing spectral characteristics for wall lighting or washing via lateral lighting distributions provided by the waveguide component. For example, in one embodiment, the first light source has a color temperature of 3500-4000K while the second light source has color temperature of 2700-3000K. Differing spectral characteristics between the first and second light sources enables a variety of functionalities from the light fixture. In some embodiments, differing spectral characteristics between the first and second light sources can be used to accent, distinguish and/or draw attention to various lighted surfaces. Moreover, differing spectral characteristics can provide information to individuals viewing the light fixture. In some embodiments, for example, the second light source provides chromaticity indicating a room or building exit such as an emergency exit. In some embodiments, the light extraction face or portion of the light extraction face of the waveguide optic can be green or red indicating a room or building exit.

In other embodiments, differing spectral characteristics between the first and second light sources can provide information regarding the operational status of the light fixture. In some embodiments, the second light source can provide one or several colors via the light extraction face or portion of the light extraction face of the waveguide optic. The color(s) can provide information regarding past, present and/or future operating status of the light fixture. For example, the second light source can provide a first color indicating the light fixture is operating within desired tolerances, such as temperature and proper light intensities. The second light source may provide a second color or additional colors to indicate various operational problems, such as overheating or variances in the down lighting distribution provided by the first light source.

The first and second light sources can be operated in conjunction with one another or can be operated independently of one another. Independent operation of the first and second light sources can permit the light fixture to provide down lighting distributions and lateral lighting distributions independent of one another. Independent operation of the first and second light sources can permit the light fixture to respond to changing needs of the surrounding environment. When a lateral lighting distribution is not needed or desired, the second light source is not powered, and the fixture only provides a down lighting distribution. Similarly, when a lateral lighting distribution is desired for wall lighting and/or lighting surfaces outside the down lighting distribution, the second light source is powered. In some embodiments, the first light source is not powered to further enhance the lateral lighting distribution provided by the second light source in conjunction with the waveguide component of the optic assembly.

As described herein, the waveguide component can comprise a plurality of waveguide optics, the waveguide optics comprising light extraction faces forming sidewall portions of the optic assembly. In embodiments comprising a plurality of waveguide optics, the second light source can exhibit the same spectral characteristics for each waveguide optic. Alternatively, the second light source can provide spectral characteristics differing between the waveguide optics. In this way, lateral lighting distributions can vary in CCT, CRI, intensity and/or chromaticity. Spectral characteristics of LEDs can differ between the waveguide optics. Moreover, LEDs of the second light source, in some embodiments, are operated independently of one another. In such embodiments, one or more waveguide optics of the light fixture can be independently selected for providing a lateral lighting distribution. This can permit high degrees of freedom and functionality for providing tailored lighting distributions of the same or different spectral characteristics. For example, one or multiple walls can be illuminated by lateral lighting distributions depending on which LEDs of the second light source and associated waveguide optic(s) are selected. Therefore, the light fixture is operable to selectively deliver light in many independent directions to wall surfaces and/or surfaces outside the down lighting distribution.

In further embodiments, the waveguide component can form part of a sensor assembly for the light fixture. A sensor assembly, in some embodiments, is employed to detect changes in the lighting environment. Changes to the lighting environment can include occupancy changes within the environment as well as ambient light changes. Lighting environment changes can also include intensity changes from the first light source and/or second light source of the fixture. One or more waveguide optics can receive light from the lighting environment for transmission to a sensor adjacent to a light coupling region of the waveguide optic. Changes in light properties received from the lighting environment via the waveguide optic can be registered by the sensor. In some embodiments, one or more LEDs of the second light source are reversed biased and can serve as a light sensor of the sensor assembly. Changes in the lighting environment registered by the sensor assembly can induce changes to the lighting properties of the light fixture. Depending on the registered change in the lighting environment, the light fixture may dim or brighten the down lighting distribution provided by the first light source and/or lateral lighting distributions provided by the second light source. In other embodiments, a registered change in the lighting environment may cause the first light source and/or second light source to turn on or off. In some embodiments wherein multiple waveguide optics are present, a registered change in the lighting environment may cause one or more second light sources to switch on or off to change lateral lighting distributions of the light fixture.

In another aspect, methods of wall illumination are described herein. In some embodiments, a method of wall illumination comprises providing a light fixture comprising a light source component positioned in an optic assembly, the light source component comprising a first light source providing a down lighting distribution and a second light source coupled to a waveguide component of the optic assembly. Light is coupled from the second light source into the waveguide component, and the light is extracted from the waveguide component to provide one or more lateral lighting distributions illuminating wall surfaces. Surfaces of one or more walls can be illuminated with the light fixture. As described further herein, lateral lighting distributions provided by the light fixtures can also illuminate non-wall surfaces falling outside the down lighting distribution provided by the first light source.

Light fixtures employed in methods of wall and surface illumination can have any architecture and properties described hereinabove. Accordingly, light extraction faces of the waveguide optics can generally face wall surfaces to be illuminated. As described above, light extraction faces forming sidewall portions of the optic assembly can be spaced apart to illuminate surfaces of multiple walls. In some embodiments, for example, multiple walls illuminated by the light fixture intersect to form a corner. In other embodiments, multiple walls face one another such as in a hallway or corridor. Light extraction faces of the fixture can have any radial or angular arrangement for delivery of lateral lighting distribution to any arrangement of wall surfaces and/or non-wall surfaces falling outside the down lighting distribution provided by the first light source. In some embodiments, light fixtures are mounted on the ceiling or recessed into the ceiling for wall illumination. Alternatively, the light fixtures can be mounted on the floor or recessed into the floor for wall illumination according to methods described herein.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A light fixture comprising:
an optic assembly having a light source receiving recess;
a light source component positioned in the light source receiving recess, the light source component comprising
a first light source providing a down lighting distribution and
a second light source coupled to a waveguide component of the optic assembly providing one or more lateral lighting distributions from the downlight fixture;
wherein the waveguide component comprises at least one waveguide optic comprising a body and a light extraction surface, the light extraction surface facing inwards towards the light source receiving recess to guide light from the second light source laterally through the light source receiving recess and forming one or more sidewall positions of the optic assembly;
the optic assembly comprises a substantially circular reflector with a recess for receiving the at least one waveguide optic.

2. The light fixture of claim 1, wherein sidewall portions of the optic assembly formed by the light extraction face are adjacent to an outer rim of the optic assembly.

3. The light fixture of claim 1, wherein the waveguide component comprises a plurality of waveguide optics, the waveguide optics comprising light extraction faces forming sidewall portions of the optic assembly.

4. The light fixture of claim 3, wherein the sidewall portions of the optic assembly formed by the light extraction faces are spaced apart from one another.

5. The light fixture of claim 3, wherein the sidewall portions of the optic assembly formed by the light extraction faces are continuous with one another.

6. The light fixture of claim 1, wherein the first light source comprises a first array of light emitting diodes, and the second light source comprises a second array of light emitting diodes.

7. The light fixture of claim 1, wherein the optic assembly comprises a reflector defining the light source receiving recess in conjunction with the light extraction face of the waveguide optic.

8. The light fixture of claim 7, wherein the reflector comprises an aperture for receiving the light extraction face of the waveguide optic.

9. The light fixture of claim 8, wherein the reflector covers the waveguide optic body.

10. The light fixture of claim 1, wherein the optic assembly comprises a refractive optic defining the light source receiving recess in conjunction with the light extraction face.

11. The light fixture of claim 1, wherein the one or more lateral lighting distributions has peak intensity at an angle of 30 to 85 degrees relative to nadir.

12. The downlight fixture of claim 1, wherein the first light source and the second light source are independently operable.

13. The downlight fixture of claim 1, wherein the first light source and the second light source have one or more differing spectral characteristics.

14. The light fixture of claim 1, wherein the fixture is a downlight fixture.

15. The light fixture of claim 1, wherein the fixture is a high bay fixture or low bay fixture.

16. A method of wall illumination comprising:
providing a light fixture comprising a light source component positioned in a light source receiving recess of an optic assembly, the light source component comprising a first light source providing a down lighting distribution and a second light source coupled to a waveguide component of the optic assembly, the waveguide component comprising at least one waveguide optic comprising a body and a light extraction surface, the light extraction surface facing inwards towards the light source receiving recess, and forming one or more sidewall portions of the optic assembly; coupling light from the second light source into the waveguide component and extracting the light from the waveguide component to provide one or more lateral lighting distributions illuminating wall surfaces.

17. The method of claim 16, wherein the one or more lateral lighting distributions has peak intensity at an angle of 30 to 85 degrees relative to nadir.

18. The method of claim 16, wherein the waveguide component comprises a plurality of waveguide optics, the waveguide optics comprising light extraction faces forming sidewall portions of the optic assembly.

19. The method of claim 18, wherein the light extraction faces of the waveguide optics face wall surfaces illuminated by the light fixture.

20. The method of claim 19, wherein the sidewall portions of the optic assembly formed by the light extraction faces are spaced apart to illuminate surfaces of multiple walls.

21. The method of claim 20, wherein the multiple walls intersect to form a corner.

22. The method of claim 20, wherein the multiple walls face one another.

23. The method of claim 16, wherein the first light source comprises a first array of light emitting diodes, and the second light source comprises a second array of light emitting diodes.

24. The method of claim 16, wherein the first light source and the second light source are independently operable.

25. The method of claim 16, wherein the first light source and the second light source have one or more differing spectral characteristics.

\* \* \* \* \*